United States Patent [19]

Barsotti et al.

US005750619A

[11] Patent Number: 5,750,619
[45] Date of Patent: May 12, 1998

[54] COATING COMPOSITION OF NON-CYCLIC ANHYDRIDE RESIN, POLYEPOXY OLIGOMER AND STABILIZED ACRYLIC RESIN

[75] Inventors: Robert John Barsotti, Franklinville, N.J.; Christopher Scopazzi, Wilmington, Del.

[73] Assignee: E. I. du Pont de Nemours and Company, Wilmington, Del.

[21] Appl. No.: 765,706
[22] PCT Filed: Jun. 16, 1995
[86] PCT No.: PCT/US95/07124
§ 371 Date: Jan. 6, 1997
§ 102(e) Date: Jan. 6, 1997
[87] PCT Pub. No.: WO96/01880
PCT Pub. Date: Jan. 25, 1996

Related U.S. Application Data

[63] Continuation of Ser. No. 272,364, Jul. 8, 1994, abandoned.
[51] Int. Cl.$^6$ ............ C08L 51/00; C08L 63/00; C08L 67/02
[52] U.S. Cl. ............................. 525/65; 525/438
[58] Field of Search .................................. 525/65

[56] References Cited

U.S. PATENT DOCUMENTS

| 4,746,714 | 5/1988 | Spinelli et al. | 525/286 |
| 5,010,140 | 4/1991 | Antonelli et al. | 525/286 |
| 5,428,082 | 6/1995 | Gould et al. | 523/400 |
| 5,633,330 | 5/1997 | Gould et al. | 525/438 |

FOREIGN PATENT DOCUMENTS

WO 94/11415  5/1994  WIPO.

*Primary Examiner*—Robert E. Sellers

[57] ABSTRACT

A curable coating composition comprises an organic solvent, a binder obtained from (a) an anhydride resin with a molecular weight of less than about 3000 containing a central organic moiety having bonded thereto non-cyclic anhydride moieties and (b) an oligomer possessing an epoxy functionality of at least 2 and a molecular weight of less than about 1500, from about 3–40% by weight of the binder of (c) a stabilized acrylic resin prepared from an acrylic polymer core having grafted thereto linear stabilizer components of an acrylic backbone with at least about 3% of epoxy-functional ethylenically unsaturated monomers, and (d) an active catalyst.

6 Claims, No Drawings

5,750,619

COATING COMPOSITION OF NON-CYCLIC ANHYDRIDE RESIN, POLYEPOXY OLIGOMER AND STABILIZED ACRYLIC RESIN

CROSS-REFERENCE TO RELATED APPLICATIONS

This is a 371 application of PCT/US95/07124, which is a continuation of U.S. application Ser. No. 08/272,364, filed Jul. 8, 1994 now abandoned.

BACKGROUND OF THE INVENTION

The present invention relates to a curable coating composition particularly useful as a top coat in multi-layered coating systems.

Base coat-clear coat systems have found wide acceptance in the past decade as automotive finishes. Continuing effort has been directed to such coating systems to improve the overall appearance, the clarity of the top coat, and the resistance to deterioration. Further effort has been directed to the development of coating compositions having low volatile organic content (VOC).

Previous efforts at improving the etch resistance and durability of coatings had suggested the use of anhydride resins having pendant non-cyclic anhydride moieties in combination with resins that react with the polyanhydride resins to cure under curing conditions. However, a continuing need exists for coating formulations which can be sprayed at low VOC and which exhibit outstanding performance characteristics after application, and particularly resistance to environmental etching.

SUMMARY OF THE INVENTION

The present invention provides a sprayable coating composition which can be easily applied at high solids and exhibits outstanding appearance and durability after application and ease of maintenance.

Specifically, the instant invention provides a curable coating composition comprising organic solvent and binder, the binder comprising (a) anhydride resin having a molecular weight of less than about 3000 that contains (1) a central moiety, and (2) on average, more than one pendant, non-cyclic anhydride moiety bonded to each central moiety;

(b) oligomer having epoxy functionality of at least 2 and having a molecular weight of less than about 1500;

(c) about from 3 to 40%, by weight of the binder, of stabilized acrylic resin having
  (i) a core of acrylic polymer which is non-soluble in organic solvent and, grafted thereto,
  (ii) a plurality of substantially linear stabilizer components having an acrylic backbone and at least about 3% ethylenically unsaturated monomers containing epoxy functionality, each of which is soluble in organic solvent and has one end grafted to the core, the stabilized acrylic resin being substantially free from non-polymerizable linear polymer; and (d) a functional amount of at least one active catalyst, wherein the ratio of equivalents of epoxy to anhydride is about from 0.5 to 1.8.

DETAILED DESCRIPTION OF THE INVENTION

Anhydride resins which can be used in the present invention include those having a molecular weight of less than about 3000 having a central moiety and more than one pendant, non-cyclic anhydride moiety bonded to each central moiety. The anhydride is asymmetrical, and preferably contains a moiety represented by the following formula:

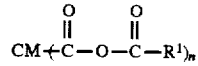

wherein (CM) is a central moiety, ($R^1$) is an organic moiety, and n is a number of pendant anhydride groups that averages greater than one.

The central moiety can be a simple organic moiety, such as an aliphatic, cycloaliphatic or aromatic moiety, with a plurality of anhydride groups bonded to it. Alternatively, it can contain a plurality of repeating units which are bonded to one or more pendant anhydride groups. Examples of suitable non-polymeric central moieties are those derived from multifunctional alcohols such as pentaerythritol, trimethylolpropane and neopentyl glycol. The multifunctional alcohols are reacted with cyclic, monomeric anhydride such as methyl hexahydrophthalic anhydride to give a multifunctional acid containing moiety. The resulting product is then reacted with ketene to form the linear pendant anhydride.

The central moiety is linked to more than one non-cyclic anhydride moiety, on average. It is preferably linked to at least about 2 non-cyclic anhydride groups on average and more preferably to at least about 3 non-cyclic anhydride groups on average. The anhydride equivalent weight (formula weight per anhydride group) is preferably at least about 200 and preferably no more than about 1000.

Each anhydride moiety is typically terminated by an organic group, which is preferably aliphatic and more preferably alkyl. It preferably contains no more than about 6 carbon atoms, more preferably no more than about 4 carbon atoms, and most preferably methyl.

The oligomeric anhydride can optionally contain a polyvalent organic moiety (A) that is linked to a plurality of anhydride groups by a plurality of pendant linking groups (LG), as illustrated in the following formula:

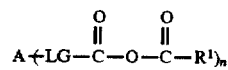

wherein $R^1$ is an organic group of 1–10 carbon atoms. The linking group (LG) can contain, for example, ester linkages, alkylene groups, ether linkages, urethane linkages and combinations of those. The polyvalent organic group can contain, for example, a polyvalent alkyl or aromatic group. The combination of the polyvalent organic moiety (A) and the linking groups (LG) forms the central moiety (CM) as previously described.

The central moiety can optionally contain other functional groups in addition to the pendant non-cyclic anhydride groups. For example, the central moiety may contain pendant acid groups, so that the anhydride is represented by the formula:

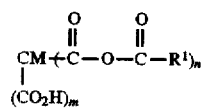

wherein m is the number of pendant acid groups and all other characters have the meaning previously given. The molar ratio of pendant non-cyclic anhydride groups to pendant acid groups in the oligomeric anhydride is preferably at least about 25:75, more preferably at least about 50:50, and more highly preferably at least about 75:25. Most preferably, the anhydride contains substantially no pendant acid groups. The central moiety can also contain minor quantities of cyclic anhydride moieties.

The molecular weight of the anhydride resin should be less than about 3000. At molecular weights of the oligomeric anhydride greater than 3000, it is difficult to attain a sprayable composition with a volatile organic content of less than about 3.5 pounds of organic solvent per gallon (0.42 kg/l) of curable compositions, which is often preferred for high solids coatings The molecular weight of the anhydride resin is preferably less than about 2000, and especially about from 400 to to 1,000. The anhydride resin preferably has 3 to 4 pendant, non-cyclic anhydride moieties bonded to each central moiety.

The oligomer component contains at least two epoxy groups and should have a molecular weight of less than about 1500. Typical epoxy components include sorbitol polyglycidyl ether, mannitol polyglycidyl ether, pentaerythritol polyglycidyl ether, glycerol polyglycidyl ether, low molecular weight epoxy resins such as epoxy resins of epichlorohydrin and bisphenol-A., di- and polyglycidyl esters of polycarboxylic acids, polyglycidyl ethers of isocyanurates, such as "Denecol" EX301 from Nagase. Sorbitol polyglycidyl ether, such as DCE-358® from Dixie Chemical, and di- and polyglycidyl esters of acids, such as Araldite CY-184® from Ciba-Geigy, or XU-71950 from Dow Chemical are preferred since they form high quality finishes. Cycloaliphatic epoxies can also be used, such as ERL4221 from Union Carbide.

The binder further comprises about from 3 to 40%, and preferably about from 10 to 25%, by weight of the binder, of a stabilized acrylic resin having a core of acrylic polymer which is non-soluble in organic solvent and, grafted thereto, a plurality of substantially linear stabilizer components having an acrylic backbone and at least about 3% ethylenically unsaturated monomers containing epoxy functionality, each of the linear stabilizer components being soluble in organic solvent and having one end grafted to the core, the stabilizer acrylic resin being substantially free of non-polymerizable linear polymer. Less than about 3% does not result in the desired improvement in performance characteristics, and little additional benefit is realized at concentrations greater than about 40%.

Typical alkyl acrylates and methacrylates that can be used to form the stabilized acrylic resin are as follows: methyl methacrylate, ethyl methacrylate, propyl methacrylate, butyl methacrylate, pentyl methacrylate, hexyl methacrylate, octyl methacrylate, decyl methacrylate, lauryl methacrylate, methyl acrylate, ethyl acrylate, propyl acrylate, butyl acrylate, octyl acrylate, nonyl acrylate, decyl acrylate, lauryl acrylate, hydroxy ethyl acrylate, hydroxy ethyl methacrylate and the like. Other components that can be used to form the stabilized acrylic resin are acrylamide, methacrylamide and acrylo alkoxy silanes such as gamma methacrylyl propyl trimethoxy silane.

The core of the stabilized acrylic resin can be crosslinked or not crosslinked, according to the desired performance characteristics. Crosslinking can be accomplished by a wide variety of diunsaturated monomers, such as allyl methacrylate or ethylene glycol diacrylate or dimethacrylate or butylene glycol diacrylate or dimethacrylate. Crosslinking of the core material can also be accomplished by reaction of the hydroxy groups of the acrylic polymer core with di- or tri-isocyanate, alone or in combination with crosslinking by the diunsaturated monomers noted above.

The particle size of the stabilized acrylic resin can vary widely, but, in general, will range from 100 nanometers to 1 micron. Preferably, the particle size of the stabilized acrylic resin is about from 100 to 400 nanometers.

The stabilizer components attached to the core are soluble in the polymerizing solvent medium. These components can be linear or branched, and are chemically attached to the surface of the core. In general, the stabilizer components have a molecular weight of about from 1,000 to 100,000 and preferably about from 2,000 to 20,000. Typical monomers used for the stabilizing components are acrylates, methacrylates, styrene, or glycidyl methacrylate or glycidyl acrylate.

In a preferred process of preparing the linear stabilizer component used in the present invention, cobalt chain transfer agent is used. The preferred catalytic chain transfer agent is a compound which contains $Co^{+2}$. Exemplary cobalt chelates are those described in U.S. Pat. No. 4,680,352 to Janowicz et al. and U.S. Pat. No. 4,722,984 to Janowicz. Most preferred chelates are pentacyanocobaltate (II), diaquabis(borondifluorodimethyl-glyoximato) cobaltate (II) and diaquabis(borondifluorodiphenylglyoximato) cobaltate (II). Alternately, $Co^{+3}$ chain transfer agents can be used, as described in PCT Patent Application WO87/03605. Such chain transfer agents are ordinarily used at concentrations of 5–150 ppm based on the monomers.

Typically, a mixture of monomers and organic liquid is heated, preferably to reflux temperature for ease of control, and to the mixture is added the catalytic chain transfer agent of choice, additional monomers and solvent, and the usual amount of a conventional polymerization initiator such as an azo- or peroxide initiator. The reaction is run, with additions of monomers and initiator as needed, until the desired stabilized acrylic resins or macromonomers are obtained having the desired molecular weight. Solvents which can be used include aromatic and aliphatic hydrocarbons esters, ketones and mixtures thereof.

The stabilized acrylic resin can be efficiently prepared in a two step process, the second of which can be run immediately after the first but which is ordinarily run after a pause for analysis and to permit more efficient use of the reactor.

The stabilized acrylic resin is prepared by (a) polymerizing one or more ethylenically unsaturated acrylic monomers, at least one of the monomers containing an epoxy functional group, using a catalytic chain transfer agent containing $Co^{+2}$ to form a stabilizer component having an ethylenically unsaturated terminal group and at least one epoxy functional group, and then (b) preparing the core component by polymerizing one or more acrylic monomers while they are in contact with stabilizer components, steps (a) and (b) being conducted in an organic liquid which is a solvent for the stabilizer components but a non-solvent for the core component.

In step one, a mixture of stabilizer monomers and organic liquid is heated, preferably to reflux temperature for ease of control, and to it is added the catalytic chain transfer agent of choice, any additional monomers and solvent, and the usual amount of a conventional polymerization initiator such as azo- or peroxide initiators. The reaction is run, with additions of monomers and initiator as needed, until the desired stabilizer component is obtained (ordinarily having a Mw of about 2000–20,000, and preferably about 3000–8000).

In step two, an organic liquid which is a solvent for the stabilizer component but a non-solvent for the core component is added to the product of step one. "Solvent" and "non-solvent" are used in the conventional sense, as will be understood by those skilled in the polymer art. Illustrative of organic liquids which can be used are aromatic- and aliphatic hydrocarbons such as heptane and VM&P naphtha. Mixtures of liquids can also be used. The stabilizer/liquid ratio is of secondary importance, but is usually in the range ½ to ¼ (weight).

The resulting mixture is again heated, preferably to reflux temperature for better control, and to it are added the core monomers and a conventional initiator such as one of those previously mentioned, in the usual amount. Polymerization is continued, with additions of liquid and initiator as needed, until it is complete, as determined by periodic sampling and analysis.

The present compositions contain a functional amount of at least one active catalyst. Particularly beneficial in the present invention are tertiary amine catalysts such as triethylene diamine, Bis(2-dimethyl aminoethyl)ether and N,N, N1, N1-tetramethylethylenediamine.

The active catalysts can be used alone or in combination with one or more additional catalysts, such as onium compounds including quaternary phosphonium and quaternary ammonium. Examples of phosphonium catalysts which can be used in catalysts blends in accordance with the present invention are benzyl triphenyl phosphonium chloride; ethyl triphenyl phosphonium bromide; tetra butyl phosphonium chloride; tetra butyl phosphonium bromide; benzyl triphenyl phosphonium iodide; benzyl triphenyl phosphonium bromide; ethyl triphenyl phosphonium iodide and the like.

The components of the present compositions are adjusted in quantity to provide a ratio of equivalence of epoxy to anhydride of about from 0.5 to 1.8, to provide good performance characteristics in the cured coating.

The coating compositions of the present invention are formulated into high solids coating systems dissolved in at least one solvent. The solvent is usually organic. Preferred solvents include aromatic hydrocarbons such as petroleum naphtha or xylenes; ketones such as methyl amyl ketone, methyl isobutyl ketone, methyl ethyl ketone or acetone; esters such as butyl acetate or hexyl acetate; and glycol ether esters such as propylene glycol monomethyl ether acetate.

The coating compositions of the present invention can also contain conventional additives such as pigments, stabilizers, rheology control agents, flow agents, toughening agents and fillers. Such additional additives will, of course, depend on the intended use of the coating composition. Fillers, pigments, and other additives that would adversely effect the clarity of the cured coating will not be included if the composition is intended as a clear coating.

The compositions of the present invention generally have a volatile organic content of less than about 3.8 pounds of organic solvent per gallon (0.46 kg/l) of curable composition, that is, at least about 50 wt % solids. The coating compositions are typically applied to a substrate by conventional techniques such as spraying, electrostatic spraying, roller coating, dipping or brushing. The present formulations are particularly useful as a clear coating for outdoor articles, such as automobile and other vehicle body parts. The substrate is generally prepared with a primer and or a color coat or other surface preparation prior to coating with the present compositions. The present coating compositions can be applied using conventional techniques such as wet-on-wet applications over solvent borne basecoats, or over dried water borne basecoats. The ability to apply the present compositions by spraying techniques with the unusually low VOC content is surprising. After application to a substrate, the present compositions are cured by heating to a temperature of about from 125° to 140° C. for a period of about from 15 to 90 minutes.

The performance characteristics of the final cured coating composition are excellent, providing a combination of excellent gloss and durability to abrasion, sunlight and acidic rain. The addition of non-aqueous dispersion or stabilized acrylic resin component in the present composition improves the rheology control of the formulation, reducing or eliminating the need for separate rheology control agents of the type previously used. Moreover, these components reduce the stress in the finished coating, thereby improving the crack resistance of the coating on outdoor exposure. At the same time, the compositions provide ease of handling, resulting from all the components being present in a single formulation, good shelf life and low volatile organic content.

The present invention is further illustrated by the following specific examples, in which parts and percentages are by weight unless otherwise indicated. Molecular weight, as used herein, unless otherwise indicated, refers to weight average molecular weight, as determined by gas phase chromatography.

EXAMPLE 1

A curable coating composition was prepared from an anhydride resin, oligomeric epoxy resin, stabilized acrylic resin and active catalyst. These components were prepared as follows.

(a) Anhydride Resin

An anhydride resin was prepared from a tetra-functional half-acid ester. The following constituents were charged to a reaction vessel equipped with a heating mantle, reflux condenser, thermometer, nitrogen inlet, and stirrer:

|  | Parts by Weight |
|---|---|
| Portion 1 | |
| Pentaerythritol | 478.0 |
| Methyl hexahydrophthalic anhydride | 2250.0 |
| Triethylamine | 0.5 |
| Portion 2 | |
| Xylol (135–145C) | 2250.0 |
| Total | 4978.5 |

Portion 1 was charged into the reaction vessel, heated to 180° C. under a nitrogen blanket and held for 30 minutes. After the hold period, the reaction mixture was cooled and Portion 2 added.

The solution prepared above was used to make a linear pendant anhydride. The solution was charged into a 5L flask equipped with a stirrer and a gas inlet tube, the gas inlet tube was attached to a ketene generator similar to the one described by Williams et al. in the Journal of Organic Chemistry 5,122, 1940. Ketene is bubbled through the solution until all of the acid groups have been converted to anhydride groups. Reaction progress was monitored via FTIR. Solvent was then removed under vacuum to give a linear pendant anhydride with the following characteristics:

% weight solids: 78.0

Anhydride eq. wt: 329+/−4 (on solution basis)

Acid eq. wt: 6176+/−1323 (on solution basis)

(b) Stabilized Acrylic Resin
Preparation of Cobalt Macromonomer

To a 2-liter flask fitted with an agitator, condenser, heating mantle, nitrogen inlet, thermocouple and an addition port was added 81.29 gms. butyl methacrylate, 243.88 gms. 2-ethyl hexyl methacrylate, 81.29 gms. glycidyl methacrylate, 210 gms. toluene and 50.1 gms. butyl acetate. The mixture was agitated and heated to reflux (135°–140° C.) under nitrogen. To this was then added, in one portion, a pre-mix of a solution of 0.35 gms. Vazo® 88, 13.8 gms. toluene and 17.2 gms. of a 0.17% solution of bis(Boron Difluoro Diphenyl Glyoximato Cobaltate (II)) in methyl ethyl ketone. This was followed by the addition of a pre-mix of a solution of 71.34 gms. butyl methacrylate, 214.02 gms. 2-ethyl hexyl methacrylate, 71.34 gms. glycidyl methacrylate, 1.35 gms. Vazo® 88 and 86.8 gms. toluene over 240 mins. while maintaining reflux (116°–122° C.). Following a 30 min. hold period, a pre-mixed solution of 0.32 gms. Vazo® 88 and 23.0 gms. toluene was added over 60 mins. while maintaining reflux. The batch was then held at reflux for an additional 60 mins. at which time a mixture of 0.23 gms. t-butyl peroctoate and 31.5 gms. of butyl acetate was added in one portion and the reaction mixture then cooled. The macromonomer thus prepared has a number average molecular weight of 3400 and a weight average molecular weight of 5500 as determined by GPC. Weight solids are 63.6% and Gardner viscosity F. The percent terminal vinyl unsaturation is >95 as determined by thermogravimetric analysis.

Preparation of Stabilized Acrylic Resin

To a 2-liter flask fitted with an agitator, condenser, heating mantle, nitrogen inlet, thermocouple and an addition port was added 222.32 gms. of cobalt macromonomer prepared above and 394.4 gms. heptane and the temperature raised to reflux (95° C.) under nitrogen at which time 0.55 gms. t-butyl peroctoate was added in one portion. This was followed by the addition of a premixed solution of 96.63 gms. methyl methacrylate, 59.16 gms. styrene, 47.33 gms. hydroxy ethyl acrylate, 70.99 gms. methyl acrylate, 39.44 gms. acrylonitrile, 1.97 gms. allyl methacrylate, 78.88 gms. glycidyl methacrylate, 110.43 gms. macromonomer of Example 1, 5.92 gms. t-butyl peroctoate and 63.7 gms toluene over 210 mins. holding reflux at 95° C. This was followed by a hold period of 45 mins. at reflux at which time a premixed solution of 3.94 gms. t-butyl peroctoate and 28 gms. toluene was added over 30 mins. while maintaining reflux. The reaction mixture was then held at reflux for 60 mins. followed by distillation of 78.88 gms. solvent to raise weight solids to 54%. Particle size as measured by quasi elastic light scattering was 206 nanometers. Gardner Holdt viscosity was A2.

Dual Crosslinked Stabilized Acrylic Resin

To a 2-liter flask fitted with an agitator, condenser, heating mantle, nitrogen inlet, thermocouple and an addition port was added 500 gms. of stabilized acrylic resin prepared above and the temperature raised to 90° C. at which time 12.5 gms. of DES3390® isocyanate and 5 gms. methyl ethyl ketone was added over 10 mins. The reaction mixture was held at 90° C. for 4 hrs. until all the isocyanate had been consumed as measured by IR. 45 gms. of solvent were then distilled to raise weight solids to 60% and the reaction mixture cooled. The crosslinked stabilized acrylic resin had a Gardner Holdt viscosity of J.

(c) Coating Composition

A clear coating preparation was prepared by combining two formulations, designated as the anhydride formulation and the epoxy formulation below. In those formulations, the linear pendent anhydride and the stabilized acrylic resin were prepared as described above.

| Anhydride Formulation | |
|---|---|
| Linear Pendant Anhydride | 63.4 |
| Tinuvin 384 | 1.9 |
| Tinuvin 292 | 1.5 |
| 20% BYK-301 (flow add from BYK chemie) in PM Acetate | 1.4 |
| 24% tetra butyl phos cl in PM Acetate | 1.7 |
| Epoxy Formulation | |
| XU-71950 (Diglycidyl ester from DOW) | 31.6 |
| Stabilized Acrylic Resin | 27.8 |
| Butyl Acetate | 24 |

This clear was sprayed over prebaked waterborne basecoat (10 min at 82° C. (180° F.)) and cured for 30 min. at 141° C. (285° F.). The resulting film had good appearance, hardness, and chemical resistance.

We claim:
1. A curable coating composition comprising organic solvent and binder, the binder comprising
   (a) anhydride resin having a molecular weight of less than about 3000 that contains (1) a central organic moiety, and (2) on average, more than one pendant, non-cyclic anhydride moiety bonded to each central moiety;
   (b) oligomer having epoxy functionality of at least 2 and having a weight average molecular weight of less than about 1500;
   (c) about 3 to 40%, by weight of the binder, of stabilized acrylic resin having
      (i) a crosslinked core of acrylic polymer polymerized from a hydroxy-functional acrylic monomer and other acrylic monomers and crosslinked by polymerization with a diunsaturated monomer followed by reaction of the hydroxy groups with a diisocyanate or triisocyanate which is non-soluble in organic solvent and, grafted thereto,
      (ii) a plurality of substantially linear stabilizer components having an acrylic backbone and at least about 3% of ethylenically unsaturated monomers containing epoxy functionality, each of which is soluble in organic solvent and has one end grafted to the core, the stabilized acrylic resin being substantially free from non-polymerizable linear polymer; and
   (d) a functional amount of at least one active catalyst, wherein the ratio of equivalents of epoxy to anhydride is about 0.5:1 to 1.8:1.
2. A composition of claim 1 wherein the stabilized acrylic resin is prepared by
   (a) polymerizing one or more ethylenically unsaturated acrylic monomers, at least one of the monomers containing an epoxy functional group, using a catalytic chain transfer agent containing $Co^{+2}$ to form a stabilizer component having an ethylenically unsaturated terminal group and at least one epoxy functional group, and then
   (b) preparing the crosslinked core component by polymerizing a hydroxy-functional acrylic monomer and other acrylic monomers and crosslinking by polymerization with a diunsaturated monomer followed by reaction of the hydroxy groups with a diisocyanate or triisocyanate while they are in contact with stabilizer components, steps (a) and (b) being conducted in an organic liquid which is a solvent for the stabilizer components but a non-solvent for the core component.

3. A composition of claim 2 wherein the chain transfer agent is a colbalt $^{+2}$ or cobalt $^{+3}$ chelate.

4. A composition of claim 3 wherein the chelate is selected from the group consisting of pentacyanocobaltate (II), diaquabis(borondifluorodimethylglyoximato)cobaltate (II) and diaquabis(borondifluorodiphenylglyoximato) cobaltate (II).

5. A composition of claim 1 wherein the active catalyst is at least one compound selected from the group consisting of tertiary amines.

6. A composition of claim 1 wherein the binder comprises about from 10 to 25% stabilized acrylic resin.

* * * * *

UNITED STATES PATENT AND TRADEMARK OFFICE
CERTIFICATE OF CORRECTION

PATENT NO. : 5,750,619

DATED : May 12, 1998

INVENTOR(S) : Barsotti et al.

It is certified that error appears in the above-identified patent and that said Letters Patent is hereby corrected as shown below:

Claim 1, should read as follows:

1. A curable coating composition comprising organic solvent and binder, the binder comprising (a) anhydride resin having a molecular weight of less than about 3000 that contains (1) a central organic moiety, and (2) on average, more than one pendant, non-cyclic anhydride moiety bonded to each central moiety;

(b) oligomer having epoxy functionality of at least 2 and having a weight average molecular weight of less than about 1500;

(c) about 3 to 40%, by weight of the binder, of stabilized acrylic resin having (i) a crosslinked core of acrylic polymer polymerized from [a] hydroxy-functional acrylic monomer and other acrylic monomers and crosslinked by polymerization with a diunsaturated monomer followed by reaction of the hydroxy groups with a diiocyanate or triisocyanate, which is non-soluble in organic solvent and, grafted thereto,

UNITED STATES PATENT AND TRADEMARK OFFICE
CERTIFICATE OF CORRECTION

PATENT NO. : 5,750,619

DATED : May 12, 1998

INVENTOR(S) : Barsotti et al.

It is certified that error appears in the above-identified patent and that said Letters Patent is hereby corrected as shown below:

(ii) a plurality of substantially linear stabilizer components having an acrylic backbone and at least about 3% of ethylenically unsaturated monomers containing epoxy functionality, each of which is soluble in organic solvent and has one end grafted to the core, the stabilized acrylic resin being substantially free from non-polymerizable linear polymer; and (d) a functional amount of at least one active catalyst, wherein the ratio of equivalents of epoxy to anhydride is about 0.5:1 to 1.8:1;

Signed and Sealed this

Ninth Day of February, 1999

Attest:

*Attesting Officer*

*Acting Commissioner of Patents and Trademarks*

UNITED STATES PATENT AND TRADEMARK OFFICE
CERTIFICATE OF CORRECTION

PATENT NO. : 5,750,619
DATED : May 12, 1998
INVENTOR(S) : Barsotti et al.

It is certified that error appears in the above-identified patent and that said Letters Patent is hereby corrected as shown below:

Claim 4, Column 9, line 4, delete [the group consisting of] and add -- a -- before "pentacyanocobaltate".

Claim 5, Column 10, line 2, after "consisting of" add -- onium compounds and --.

Signed and Sealed this

Sixth Day of April, 1999

Attest:

Q. TODD DICKINSON

*Attesting Officer*   Acting Commissioner of Patents and Trademarks

UNITED STATES PATENT AND TRADEMARK OFFICE
CERTIFICATE OF CORRECTION

PATENT NO. : 5,750,619
DATED      : May 12, 1998
INVENTOR(S): Robert J. Barsotti, et al It is certified that error appears in the above-identified patent and that said Letters Patent is hereby corrected as shown below:

This certificate supersedes Certificate of Correction issued
April 6, 1999, the number was erroneously mentioned and
should be deleted since no Certificate of Correction was granted.

Signed and Sealed this

Fifteenth Day of June, 1999

Attest:

Q. TODD DICKINSON

*Attesting Officer*   *Acting Commissioner of Patents and Trademarks*